United States Patent
Kwant et al.

(10) Patent No.: US 9,940,729 B1
(45) Date of Patent: Apr. 10, 2018

(54) DETECTION OF INVARIANT FEATURES FOR LOCALIZATION

(71) Applicant: HERE GLOBAL B.V., Eindhoven (NL)

(72) Inventors: Richard Kwant, Oakland, CA (US); Anish Mittal, Berkeley, CA (US); Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 20 days.

(21) Appl. No.: 15/355,727

(22) Filed: Nov. 18, 2016

(51) Int. Cl.
G06K 9/62 (2006.01)
G06T 7/60 (2017.01)
G06T 7/00 (2017.01)

(52) U.S. Cl.
CPC .............. *G06T 7/60* (2013.01); *G06T 7/0042* (2013.01); *G06T 2207/10004* (2013.01); *G06T 2207/20084* (2013.01)

(58) Field of Classification Search
CPC .......... G06K 9/66; G06K 9/4628; G06K 9/32; G06K 9/2013; G06K 9/344; G06K 9/6269; G06K 9/4604; G06K 9/6202; G06T 7/60; G06T 7/0042
See application file for complete search history.

(56) References Cited

U.S. PATENT DOCUMENTS

| | | | | |
|---|---|---|---|---|
| 5,884,294 | A * | 3/1999 | Kadar | G06K 9/6267 382/155 |
| 8,306,932 | B2 * | 11/2012 | Saxena | G06N 3/08 706/42 |
| 8,401,783 | B2 | 3/2013 | Hyung et al. | |
| 8,527,445 | B2 | 9/2013 | Karins et al. | |
| 8,933,931 | B2 | 1/2015 | Balan et al. | |
| 9,730,643 | B2 * | 8/2017 | Georgescu | A61B 5/7267 |
| 9,792,534 | B2 * | 10/2017 | Wang | G06K 9/6269 |

(Continued)

OTHER PUBLICATIONS

Aijazi, Ahmad Kamal, et al., "Automatic Removal of Imperfections and Change Detection for Accurate 3D Urban Cartography by Classification adn incremental Updating", *Remote Sensing*, Jul. 30, 2013, pp. 3701-3728, vol. 5 retrieved from <http://www.mdpi.com/2072-4292/5/8/3701 > on Mar. 2, 2017.

(Continued)

*Primary Examiner* — Amir Alavi
(74) *Attorney, Agent, or Firm* — Alston & Bird LLP (57) ABSTRACT

A first image and a second image are provided to a trained neural network. The first image comprises one or more static features and the second image comprises at least one of the one or more static features. A static feature is identified in both the first and second images by a branch of the trained neural network. A three dimensional image comprising the identified static feature is generated and three dimensional geometric information/data related to the static feature is extracted and stored in association with a tile of a digital map. A set of training images may be used to train the trained neural network comprises training image subsets comprising two or more images that substantially overlap that were (a) captured at different times; (b) captured under different (i) weather conditions, (ii) lighting conditions, or (iii) weather and lighting conditions; or both a and b.

20 Claims, 5 Drawing Sheets

(56) References Cited

U.S. PATENT DOCUMENTS

| | | | |
|---|---|---|---|
| 2008/0025568 | A1 | 1/2008 | Han et al. |
| 2016/0139255 | A1 | 5/2016 | Bueschenfeld et al. |
| 2016/0147230 | A1 | 5/2016 | Munich et al. |
| 2017/0193315 | A1* | 7/2017 | El-Khamy .......... G06K 9/00288 |
| 2017/0200065 | A1* | 7/2017 | Wang ................... G06F 17/3028 |
| 2018/0018535 | A1* | 1/2018 | Li ........................ G06K 9/4628 |

OTHER PUBLICATIONS

Cadena, Cesar, et al., "Semantic Segmentation of Urban Environments Into Object and Background Categories", George Mason University, Department of Computer Science, Technical Report GMU-CS-TR-2013-6, Jan. 2013, 10 pages, retrieved from <https://cs.gmu.edu/~tr-admin/papers/GMU-CS-TR-2013-6.pdf> on Mar. 2, 2017.

Durrant-Whyte, Hugh, et al., "Simultaneous Localisation and Mapping (SLAM): Part I The Essential Algorithms", *Robotics and Automation Magazine*, Jun. 2006, 9 pages, retrieved from <http://www-personal.acfr.usyd.edu.au/tbailey/papers/slamtute1.pdf> on Mar. 2, 2017.

Lowe, David G., "Object Recognition from Local Scale-Invariant Features", Proceedings of the Seventh IEEE International Conference on Computer Vision, Corfu, Sep. 1999, 8 pages, vol. 2, retrieved from <http://www.cs.ubc.ca/~lowe/papers/iccv99.pdf> on Mar. 2, 2017.

MOBILEYE, "Mobileye Features", copyright 2017, retrieved from <http://www.mobileye.com/en-us/technology/features/> on Mar. 2, 2017.

Sünderhauf, Niko, et al., "Place Recognition with ConvNet Landmarks: Viewpoint-Robust, Condition-Robust, Training-Free", Proceedings of Robotics: Science and Systems, 2015, 10 pages, retrieved from <http://eprints.qutedu.au/84931/1/rss15_placeRec.pdf> on Mar. 2, 2017.

U.S. Appl. No. 15/375,513, "Pose Error Estimation and Localization Using Static Features", Unpublished (filing date Dec. 12, 2016), (Richard Kwant, Inventor) (Here Global B.V., assignee).

* cited by examiner

DETECTION OF INVARIANT FEATURES FOR LOCALIZATION

TECHNOLOGICAL FIELD

An example embodiment relates generally to localization. In particular, an example embodiment generally relates to generating invariant feature information/data that may be used for localization that may, for example, enable autonomous and/or assisted driving of a vehicle.

BACKGROUND

Autonomous driving requires high accuracy, real-time localization of vehicles. Currently, most vehicle navigation has been accomplished using a global positioning system (GPS), which provides a real-time location with a 95% confidence interval of 7.8 meters, according to the US government. However, in complicated urban environments, reflection in GPS signals can further increase this error, such that a determined location may be off by as much as 30 meters. Given that the width of many lanes is only 3 to 4 meters, this accuracy is not sufficient to properly localize an autonomous vehicle so that it can make appropriate route planning decisions. Other sensors, such as inertial measurement units (IMUs) can increase the accuracy of localization by taking into account vehicle movement, but these sensors tend to drift and still do not provide sufficient accuracy for localization. In general, the industry recognizes that a localization accuracy of around 10 cm is desired for autonomous driving in many areas.

BRIEF SUMMARY

An example embodiment provides a trained neural network for identifying generic static references in images. The trained neural network may then be used to build a static feature library, database, repository, and/or the like. The static feature library, database, or repository may be used for vehicle localization and/or pose determination. For example, static feature information/data may be embedded within a map tile of a digital map. In particular, methods, apparatus, and computer program products are provided in accordance with an example embodiment in order to build a static feature library, database, or repository to enable vehicle localization and pose determination, wherein the static feature library, database, or repository is built using a trained neural network for identifying generic static features in images. A first image is provided to a trained neural network. The first image is captured by an image capture device at a first location and at a first pose. The first image is associated with geophysical coordinates corresponding to the first location. The first image comprises one or more static features. A second image is provided to the trained neural network. The second image is captured by an image capture device at a second location and at a second pose. The second image is associated with geophysical coordinates corresponding to the second location. The second image comprises at least one of the one or more static features. At least one of the one or more static features in both the first and second images is identified by a branch of the trained neural network. A three dimensional image is generated. The three dimensional image comprises the at least one identified static feature and is based on the first and second images. A three dimensional geometry of the at least one identified static feature is extracted. The extracted three dimensional geometry is encoded as an array. Based on the first location and the second location, a static feature location is determined for the at least one identified static feature. The array is stored in association with a map tile. The map tile is selected based on the static feature location.

In accordance with an example embodiment, a method is provided that comprises providing to a trained neural network a first image. The first image (a) is captured by an image capture device at a first location and at a first pose, (b) is associated with geophysical coordinates corresponding to the first location, and (c) comprises one or more static features. The method further comprises providing to the trained neural network a second image. The second image (a) is captured by an image capture device at a second location and at a second pose, (b) is associated with geophysical coordinates corresponding to the second location, and (c) comprises at least one of the one or more static features. The method further comprises identifying the at least one of the one or more static features in both the first and second images with a branch of the trained neural network; and generating a three dimensional image comprising the at least one identified static feature and based on the first and second images. The method further comprises extracting a three dimensional geometry of the at least one identified static feature; encoding the extracted three dimensional geometry as an array; and based on the first location and second location, determining a static feature location for the at least one identified static feature. The method further comprises storing the array in association with a map tile, wherein the map tile is selected based on the static feature location.

In an example embodiment, a set of training images used to train the trained neural network comprises training image subsets comprising two or more images that substantially overlap that were captured at different times. In an example embodiment, a training set of images used to train the trained neural network comprises training image subsets comprising two or more images that substantially overlap that were captured under different (a) weather conditions, (b) lighting conditions, or (c) weather and lighting conditions. In an example embodiment, the three dimensional image is a binary feature map. In an example embodiment, the array comprises shape information for the corresponding static feature. In certain example embodiments, at least one training image of a set of training images used to train the trained network comprises at least one pixel that is masked, the at least one masked pixel corresponding to a non-static feature in the training image. In an example embodiment, (a) the first location differs from the second location, (b) the first pose differs from the second pose, or (c) both a and b. In an example embodiment, the static feature of the one or more static features is a generic static feature. In an example embodiment, static feature information is stored in association with the map tile, the static feature information comprising the array and the static feature location. For example, static feature information may be stored in association with a road segment of the map tile. For example, a static feature orientation may be determined from at least one of the first location, first pose, second location, or second pose. In certain example embodiments, the static feature information further comprises the static feature orientation.

In accordance with an example embodiment, an apparatus is provided that comprises at least one processor and at least one memory storing computer program code with the at least one memory and the computer program code being configured to, with the processor, cause the apparatus to at least provide to a trained neural network a first image. The first image (a) is captured by an image capture device at a first location and at a first pose, (b) is associated with geophysical coordinates corresponding to the first location, and (c) comprises one or more static features. The at least one memory and the computer program code are further configured to, with the processor, cause the apparatus to at least provide to the trained neural network a second image. The second image (a) is captured by an image capture device at a second location and at a second pose, (b) is associated with geophysical coordinates corresponding to the second location, and (c) comprises at least one of the one or more static features. Identify the at least one of the one or more static features in both the first and second images with a branch of the trained neural network. The at least one memory and the computer program code are further configured to, with the processor, cause the apparatus to at least generate a three dimensional image comprising the at least one identified static feature and based on the first and second images; extract a three dimensional geometry of the at least one identified static feature; and encode the extracted three dimensional geometry as an array. The at least one memory and the computer program code are further configured to, with the processor, cause the apparatus to at least, based on the first location and second location, determine a static feature location for the at least one identified static feature. The at least one memory and the computer program code are further configured to, with the processor, cause the apparatus to at least store the array in association with a map tile, wherein the map tile is selected based on the static feature location.

In an example embodiment, a set of training images used to train the trained neural network comprises training image subsets comprising two or more images that substantially overlap that were captured at different times. In an example embodiment, a training set of images used to train the trained neural network comprises training image subsets comprising two or more images that substantially overlap that were captured under different (a) weather conditions, (b) lighting conditions, or (c) weather and lighting conditions. In an example embodiment, the three dimensional image is a binary feature map. In certain example embodiments, the array comprises shape information for the corresponding static feature. In an example embodiment, at least one training image of a set of training images used to train the trained network comprises at least one pixel that is masked, the at least one masked pixel corresponding to a non-static feature in the training image. In certain example embodiments, (a) the first location differs from the second location, (b) the first pose differs from the second pose, or (c) both a and b. In an example embodiment, the static feature of the one or more static features is a generic static feature. In an example embodiment, static feature information is stored in association with the map tile, the static feature information comprising the array and the static feature location. For example, static feature information may be stored in association with a road segment of the map tile. For example, a static feature orientation may be determined from at least one of the first location, first pose, second location, or second pose. In an example embodiment, the static feature information further comprises the static feature orientation.

In accordance with an example embodiment, a computer program product is provided that comprises at least one non-transitory computer-readable storage medium having computer-executable program code instructions stored therein with the computer-executable program code instructions comprising program code instructions configured to provide to a trained neural network a first image. The first image (a) is captured by an image capture device at a first location and at a first pose, (b) is associated with geophysical coordinates corresponding to the first location, and (c) comprises one or more static features. The computer-executable program code instructions further comprise program code instructions configured to provide to the trained neural network a second image. The second image (a) is captured by an image capture device at a second location and at a second pose, (b) is associated with geophysical coordinates corresponding to the second location, and (c) comprises at least one of the one or more static features. Identify the at least one of the one or more static features in both the first and second images with a branch of the trained neural network. The computer-executable program code instructions further comprise program code instructions configured to generate a three dimensional image comprising the at least one identified static feature and based on the first and second images; extract a three dimensional geometry of the at least one identified static feature; and encode the extracted three dimensional geometry as an array. The computer-executable program code instructions further comprise program code instructions configured to, based on the first location and second location, determine a static feature location for the at least one identified static feature. The computer-executable program code instructions further comprise program code instructions configured to store the array in association with a map tile, wherein the map tile is selected based on the static feature location.

In an example embodiment, a set of training images used to train the trained neural network comprises training image subsets comprising two or more images that substantially overlap that were captured at different times. In an example embodiment, a training set of images used to train the trained neural network comprises training image subsets comprising two or more images that substantially overlap that were captured under different (a) weather conditions, (b) lighting conditions, or (c) weather and lighting conditions. In an example embodiment, the three dimensional image is a binary feature map. In certain example embodiments, the array comprises shape information for the corresponding static feature. In an example embodiment, at least one training image of a set of training images used to train the trained network comprises at least one pixel that is masked, the at least one masked pixel corresponding to a non-static feature in the training image. In certain example embodiments, (a) the first location differs from the second location, (b) the first pose differs from the second pose, or (c) both a and b. In an example embodiment, the static feature of the one or more static features is a generic static feature. In an example embodiment, static feature information is stored in association with the map tile, the static feature information comprising the array and the static feature location. In an example embodiment, a static feature may be a feature that is expected to not change significantly over a time period (e.g., days, weeks, months, a year, a few years, and/or the like). In an example embodiment, a static feature may be a feature that is detectable and/or identifiable in an image captured under varying weather, lighting, and/or traffic conditions. Some non-limiting examples of invariant or static features are building facades, lamp posts/street lamps, telephone poles, signs, lane lines, features within the driving surface, geological features, guard rails, mile markers, and/or the like. In an example embodiment, one or more static features may not have semantic meaning. For example, a static feature may be a feature within the road surface and/or the like. For example, static feature information may be stored in association with a road segment of the map tile. For example, a static feature orientation may be determined from at least one of the first location, first pose, second location, or second pose. In an example embodiment, the static feature information further comprises the static feature orientation.

In accordance with yet another example embodiment of the present invention, an apparatus is provided that comprises means for providing to a trained neural network a first image. The first image (a) is captured by an image capture device at a first location and at a first pose, (b) is associated with geophysical coordinates corresponding to the first location, and (c) comprises one or more static features. The apparatus further comprises means for providing to the trained neural network a second image. The second image (a) is captured by an image capture device at a second location and at a second pose, (b) is associated with geophysical coordinates corresponding to the second location, and (c) comprises at least one of the one or more static features. The apparatus further comprises means for identifying the at least one of the one or more static features in both the first and second images with a branch of the trained neural network. The apparatus further comprises means for generating a three dimensional image comprising the at least one identified static feature and based on the first and second images. The apparatus further comprises means for extracting a three dimensional geometry of the at least one identified static feature; and means for encoding the extracted three dimensional geometry as an array. The apparatus further comprises means for, based on the first location and second location, determining a static feature location for the at least one identified static feature. The apparatus further comprises means for storing the array in association with a map tile, wherein the map tile is selected based on the static feature location.

BRIEF DESCRIPTION OF THE DRAWINGS

Having thus described certain example embodiments in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment to train a deep nets/neural network to identify generic invariant and/or static features in images and to use the trained network to develop and/or generate a library or database of static feature information/data that can be used for real time or near real time accurate localization. For example, the generated static feature information/data may be used for real time or near real time localization of a vehicle (e.g., an autonomously driven vehicle, a vehicle operating with assisted driving, a manually driven vehicle, and/or the like). In an example embodiment, an invariant or static feature may be a feature that is expected to not change significantly over a time period (e.g., days, weeks, months, a year, a few years, and/or the like). For example, an invariant or static feature may not change significantly with a change of seasons. In an example embodiment, an invariant or static feature may be a feature that is detectable and/or identifiable in an image captured under varying weather, lighting, and/or traffic conditions. Some non-limiting examples of invariant or static features are building facades, lamp posts/street lamps, telephone poles, signs, lane lines, features within the driving surface, geological features, guard rails, mile markers, and/or the like. In an example embodiment, one or more static features may not have semantic meaning. For example, a static feature may be a feature within the road surface and/or the like.

In certain example embodiments, the network may be trained by providing a set of training images comprising two or more images of similar scenes to the network. In particular, the two or more images of similar scenes may be taken from similar locations, similar poses, and/or the like such that there is a substantial overlap in the field of view shown in the images. For example, two images may substantially overlap if at least one static feature is present and/or identifiable in both images. The two or more images, however, are captured at different times. For example, the two or more images may be taken hours apart, days apart, and/or weeks apart. In some example embodiment, one or more months or a longer time period may pass between the capturing of the two or more images. In some embodiments, the two or more images may be captured under different weather conditions, different lighting conditions, different traffic conditions, and/or the like.

Figure 1:
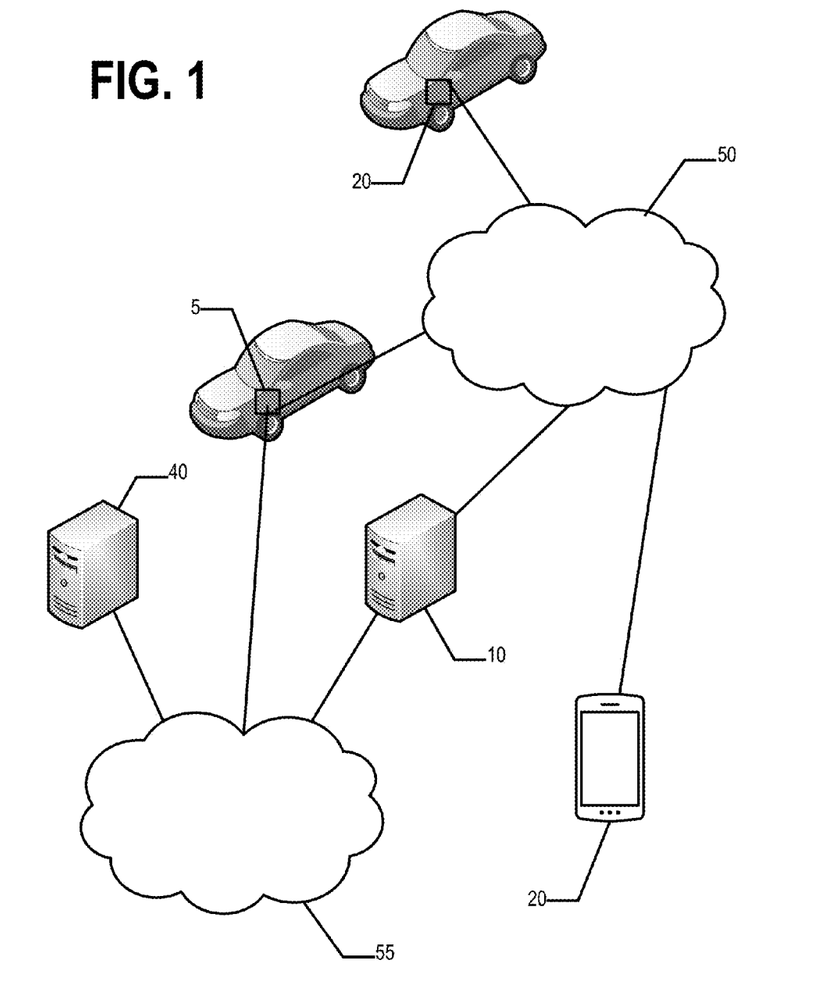
FIG. 1 is a block diagram showing an example architecture of one embodiment of the present invention.

FIG. 1 provides an illustration of an example system that can be used in conjunction with various embodiments of the present invention. As shown in FIG. 1, the system may include one or more image capture apparatuses 5, one or more vehicle apparatuses 20, one or more apparatuses 10, one or more deep nets/neural networks 40, one or more communication networks 50, 55, and/or the like.

Figure 2:
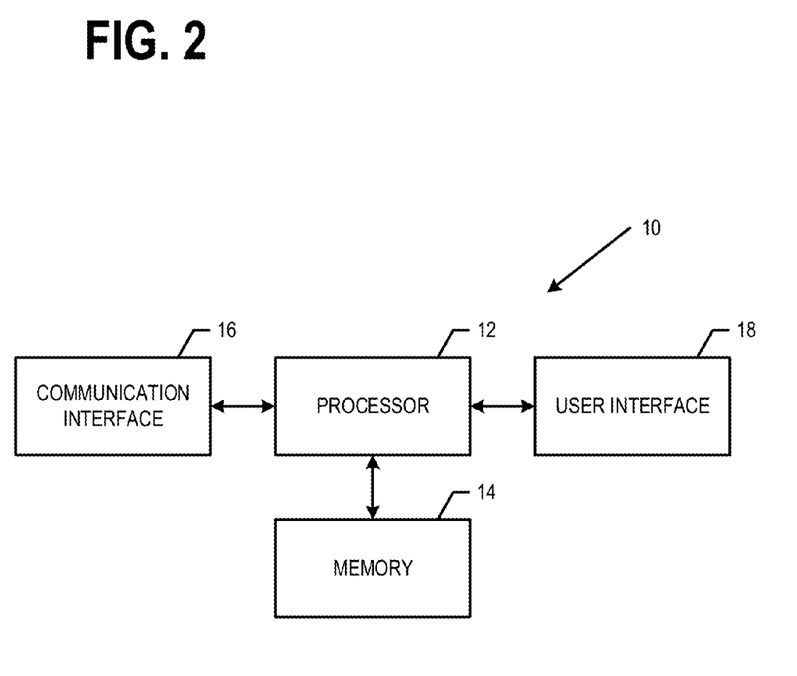
FIG. 2 is a block diagram of an apparatus that may be specifically configured in accordance with an example embodiment.

In an example embodiment, an apparatus 10 may comprise components similar to those shown in the example apparatus 10 diagrammed in FIG. 2. In an example embodiment, the apparatus 10 is configured to train the network 40; store and/or organize static reference information/data generated by the network 40; receive images captured by the image capture apparatus 5; provide map updates, static feature information/data and/or the like to the vehicle apparatus 20; and/or the like. In various embodiments, the apparatus 10 may be located remotely from the vehicle apparatus 20. Each of the components of the system may be in electronic communication with, for example, one another over the same or different wireless or wired communication networks 50, 55 including, for example, a wired or wireless Personal Area Network (PAN), Local Area Network (LAN), Metropolitan Area Network (MAN), Wide Area Network (WAN), cellular network, and/or the like. In some embodiments, a communication network 50 may comprise the automotive cloud, digital transportation infrastructure (DTI), radio data system (RDS)/high definition (HD) radio or other digital radio system, and/or the like. For example, a vehicle apparatus 20 may be in communication with an apparatus 10 via the communication network 50. For example, the vehicle apparatus 20 may communicate with the apparatus 10 via the cloud. For example, the vehicle apparatus 20 may be configured to receive one or more map tiles of a digital map (e.g., comprising static feature information/data) from the apparatus 10.

As shown in FIG. 2, the apparatus 10 may comprise a processor 12, memory 14, a user interface 18, a communications interface 16, and/or other components configured to perform various operations, procedures, functions or the like described herein. Certain example embodiments of the apparatus 10 are described in more detail below with respect to FIG. 2.

In various embodiments, the vehicle apparatus 20 may be an in vehicle navigation system, vehicle control system, a mobile computing device, and/or the like. For example, a vehicle apparatus 20 may be an in vehicle navigation system mounted within and/or be on-board a vehicle such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle, assist in control of a vehicle, and/or the like. In certain example embodiments, a vehicle apparatus 20 is configured to receive static feature information/data generated by the network 40 (e.g., as part of a map tile, as a feature map, and/or the like). The vehicle apparatus 20 may then use a portion of the received static feature information/data to perform localization and/or pose determination corresponding to the vehicle that the vehicle apparatus 20 is on-board.

In an example embodiment, a vehicle apparatus 20 may comprise components similar to those shown in the example apparatus 10 diagrammed in FIG. 2. For example, a vehicle apparatus may comprise a processor, memory, a user interface, a communications interface, and/or other components configured to perform various operations, procedures, functions, and/or the like. In certain example embodiments, a vehicle apparatus 20 may comprise one or more location sensors (e.g., a location sensor such as a GPS sensor; IMU sensors, and/or the like), one or more image capturing devices (e.g., camera(s); two dimensional (2D) and/or three dimensional (3D) light detection and ranging (LiDAR); long, medium, and/or short range radio detection and ranging (RADAR); ultrasonic sensors; electromagnetic sensors; (near-) infrared (IR) cameras, 3D cameras, 360° cameras and/or the like) and/or other sensors that enable the vehicle apparatus 20 to determine one or more features of the corresponding vehicle's surroundings.

In an example embodiment, an image capture apparatus 5 may be similar to a vehicle apparatus 20. For example, in some embodiments, an image capture apparatus 5 may be on-board a vehicle (e.g., a motor vehicle, non-motor vehicle, automobile, car, scooter, truck, van, bus, motorcycle, bicycle, Segway, golf cart, and/or the like), on-board an aerial vehicle (e.g., airplane, helicopter, satellite, hot air balloon, blimp, and/or the like), and/or the like. For example, an image capture apparatus 5 may be configured to capture images that may be incorporated into a set of training images and/or analyzed by a trained network to generate static feature information/data corresponding to features within the image. Thus, in an example embodiment, the image capture apparatus 5 may be configured to capture one or more images and provide the images to the apparatus 10. Additionally, the image capture apparatus 5 may determine location and/or pose information/data corresponding to each captured image and provide the location and/or pose information/data to the apparatus 10 in association with the corresponding image. To this end, an image capture device 5 may comprise a processor, memory, a user interface, a communications interface, one or more location sensors (e.g., a location sensor such as a GPS sensor; IMU sensors, and/or the like), one or more image capturing devices (e.g., camera(s); 2D and/or 3D LiDAR(s); long, medium, and/or short range RADAR; ultrasonic sensors; electromagnetic sensors; (near-)IR cameras, 3D cameras, 360° cameras and/or the like) and/or other sensors that enable the image capture apparatus 5 to determine one or more features of the corresponding image capture apparatus' surroundings and/or other components configured to perform various operations, procedures, functions, and/or the like. In an example embodiment, an image may be a still image, a video, and/or the like.

In an example embodiment, at least some of the images captured by the image capturing apparatus 5 may be provided to the network 40 (e.g., by the apparatus 10) as part of a set of training images and/or to extract and/or generate static feature information/data therefrom. In certain example embodiments, the network 40 is a deep net and/or neural network. For example, the network 40 may comprise a plurality of nodes. Each node may comprise one or more processors and/or processing units and may be in communication with memory and/or at least one other node. In an example embodiment, the network 40 has a Siamese encoder-decoder architecture. For example, the architecture of the network 40 may be similar and/or based on the VGG16 neural network. After training, one half of the network would be used as a feature encoder to detect the latent time-invariant and/or static features in images. In general, encoder-decoder networks reduce high-dimensional input (e.g., such as images or videos) to a lower dimensional vector that can encode only simple shapes and/or attributes. Thus, in an example embodiment, an encoder-decoder network may be configured to receive an image and extract and/or generate static feature information/data such as information/data defining the shape or other attributes of the static feature. As shown in FIG. 1, the network 40 is a distinct computing entity from the apparatus 10. In other embodiments, the apparatus 10 may comprise at least one node of the network 40 and/or the like.

II. Example Operation

In an example embodiment, a deep net/neural network 40 is trained to identify static features within images and extract and/or generate static feature information/data corresponding to the static feature(s) present and/or identifiable within the images. The static feature information/data may be stored in a library or database and/or stored in association with a digital map. For example, the apparatus 10 may store static feature information/data as a layer and/or in association with a map tile in which the corresponding static feature is located. The map tile and/or static feature information/data may then be provided to one or more vehicle apparatuses 20. The vehicle apparatuses 20 may use the static feature information/data to perform localization and/or pose determination using various odometry techniques. In an example embodiment, the vehicle apparatuses 20 may use the static feature information/data to perform localization and/or pose determination using techniques such as those described in co-pending U.S. Patent Application titled "Pose Error Estimation And Localization Using Static Features" 15/375,513 which is incorporated by reference herein in its entirety.

Before the network 40 is used to extract and/or generate static feature information/data from images comprising the corresponding static features, the network 40 is trained. For example, a plurality of images may be received from one or more image capture apparatuses 5. A set of training images may be selected and/or built from the plurality of images. In an example embodiment, a user (e.g., operating the apparatus 10 and/or a client thereof) may select training images from the plurality of images for building the set of training images. In one embodiment, the apparatus 10 may select the training images from the plurality of images. Thus, a set of training images may be built to train the network 40 to identify invariant and/or static features within images. In an example embodiment, pixels corresponding to non-static features within the training images may be masked. For example, pixels corresponding to a vehicle, temporary sign or structure, and/or the like may be masked. The training images may then be provided to the network 40.

In an example embodiment, similar images that were taken at different times may be provided to two different branches of the network 40. Each branch of the network may analyze the image provided thereto to identify one or more static features therein, extract static feature information/data therefrom, and generate a feature map based on the static feature information/data. The feature maps from the different branches may be compared using a loss function to penalize inaccurate pose estimations and encourage consistent static feature detection by the network 40.

In some example embodiments, the network 40 may be provided with three or more images. Two or more images may be similar to each other and at least one image may be unsimilar. For example, two or more images may substantially overlap and at least one image may not substantially overlap. For example, three images may be provided to the network wherein two of the images substantially overlap and the third image does not overlap with either of the first two images. The network 40 may then be asked to determine which of the three images are alike and/or which of the three images is different.

Once the network 40 is trained, branches of the network 40 may be used to analyze images (e.g., captured by an image capturing device 5) to extract and/or generate static feature information/data therefrom. For example, an image or two or more images that substantially overlap but that were captured at different times may be provided to a branch of the network 40. The network 40 may analyze the image(s) to identify one or more static features therein and extract the three dimensional geometries of the static features. The three dimensional geometry of a static feature may be encoded into an array and stored in association with location and/or orientation information/data corresponding to the static feature. Thus, in certain example embodiments, the static feature information/data corresponding to a static feature may comprise ground true location and/or orientation information/data for the static feature and three dimensional geometry information/data for the static feature.

In an example embodiment, when the image capturing device 5 captures an image, image location and/or pose information/data may be captured. For example, the location sensor of the image capturing device 5 may determine a geolocation of the image capturing device and a pose of the image capturing device at the time/moment the image was captured. The image capturing device 5 may then provide the image location and/or pose information/data to the apparatus 10 with the corresponding image. The apparatus 10 or network 40 may then determine location and/or pose information/data corresponding to a static feature in an image based on the corresponding image location and/or pose information/data. In certain example embodiments, the location information/data may comprise geospatial coordinates (e.g., latitude and longitude, and/or the like) corresponding to the physical location of static feature. In an example embodiment, the pose or orientation (which are used interchangeably herein) information/data may be comprise an angle describing orientation of the static feature with respect to a reference direction. For example, the pose or orientation information/data may comprise the expected angle between a reference direction (e.g., North and/or the like) and the normal to a building façade and/or the like.

In an example embodiment, the array encoding the static feature information/data may comprise information/data indicating the geometry, shape, size, texture, and/or the like of a static feature. In certain example embodiments, the static feature information/data may be used to generate a feature map comprising the corresponding static feature. In an example embodiment, the feature map is a binary map. In some embodiments, the feature map is a multi-channel representation of one or more reference static features. In certain example embodiments, the static feature information/data is ground true information/data. For example, the static feature information/data (e.g., location and/or orientation information/data and/or three dimensional geometry information/data corresponding to a static feature) may be determined through direct observation of the static feature.

The static feature information/data may be stored in a static feature library or database. In an example embodiment, the static feature information/data may be stored in association with and/or incorporated into a digital map. For example, a map may be tiled such that map information/data may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the map. In other embodiments, the tiles may vary in size and/or shape based on the geography of the map region, the topology of the map region, population or feature density within the map region, and/or the like. For example, static feature information/data corresponding to a static feature may be stored in association with, linked to, and/or as a layer or the like of a map tile within which the static feature is located. In an example embodiment, the static feature information/data may be linked to a road segment within the digital map (and/or a tile there of) corresponding to the location of the static feature. Thus, the static feature information/data may be easily provided to one or more vehicle apparatuses 20 with a map update (e.g., one or more updated map tiles) and/or efficiently accessed by a vehicle apparatus 20 to perform real time or near real time localization and/or pose determination. Various aspects of the present invention will now be described in more detail.

Training the Deep Net/Neural Network

Figure 3:
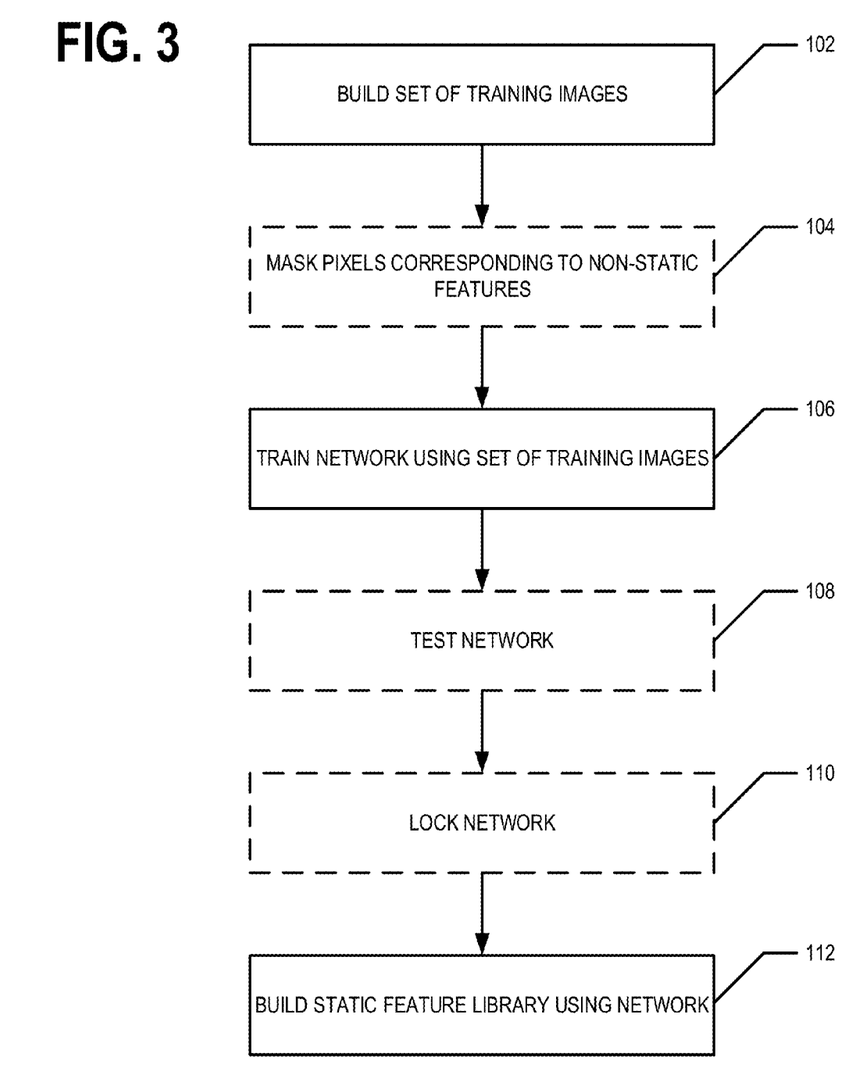
FIG. 3 is a flowchart illustrating operations performed, such as by the apparatus of FIG. 2, in accordance with an example embodiment.

FIG. 3 provides a flowchart of processes and procedures that may be completed by the apparatus 10 to train the network 40 and utilize the trained network 40 to build a static feature information/data database, repository, library, and/or the like. Starting at block 102, a set of training images is built. For example, the apparatus 10 may build a set of training images. For example, the apparatus 10 may comprise means, such as the processor 12, memory 14, communications interface 16, user interface 18, and/or the like, for building a set of training images. For example, the apparatus 10 may receive a plurality of images from the image capturing apparatus 5. The apparatus 10 may further receive location and/or pose information/data corresponding to each of the plurality of images from the one or more image capturing apparatuses 5. A set of training images may be built and/or selected from the plurality of images. In an example embodiment, the set of training images may be automatically built by the apparatus 10, manually built by a user of the apparatus 10, and/or a combination thereof. In certain example embodiments, the set of training images comprises two or more training images that substantially overlap. For example, the set of training images may comprise a plurality of training image subsets. Each training image subset may comprise two or more training images that substantially overlap and that were taken at different times and/or under different conditions. For example, a period of time that is at least an hour long, at least a day long, at least a week long, at least a month long, and/or the like may exist between when a first training image of the two or more training images was captured and when a second training image of the two or training images was captured. For example, a first training image of the two or more training images may have been captured on a sunny day, a second training image of the two or more training images may have been captured on a cloudy day, a third training image of the two or more training images may have been captured when it was raining, and a fourth training image of the two or more training images may have been captured at night. Thus, the training image subsets may each comprise two or more training images that substantially overlap and that were captured at different times and/or under different conditions.

At block 104, the pixels corresponding to non-static features in the training images may optionally be masked. For example, a user (e.g., operating the apparatus 10 and/or a client thereof) may identify pixels corresponding to non-static features in the training images and cause the identified pixels to be masked. For example, the apparatus 10 may mask the pixels in the training images corresponding to non-static features. For example, the apparatus 10 may comprise means, such as processor 12, memory 14, communication interface 16, user interface 18, and/or the like, for masking the pixels in the training images that correspond to non-static features.

At block 106, the network 40 may be trained using the set of training images. For example, the apparatus 10 may provide the network 40 with the set of training images and/or monitor the training of the network 40. For example, the apparatus 10 may provide means, such as the processor 12, communications interface 16, user interface 18, and/or the like for providing the network 40 with the set of training images and/or monitoring the training of the network 40. For example, the network 40 could be trained using stochastic gradient descent using standard libraries used for training deep neural networks. During the training of the network 40, the set of training images may be processed a plurality of times as the connection weights of the network are refined. For example, the training of the network 40 may be a process during which the connection weights of the network are refined until the ability of the network to consistently identify static features within the training images, extract three dimensional geometry information/data of the identified static features, and/or generate a feature map comprising the identified static features converges.

In an example embodiment, geometric context information is used to enforce the constraint that regions belonging to the same context co-occur together. For example, location and/or pose information/data and/or depth information/data corresponding to the training images may also be provided to the network 40. Thus, the network 40 may determine the relative pose between two training images for determining the similarity between training images. The location and/or pose information corresponding to the training images can be used to directly align the two training images and/or their corresponding feature maps to determine what elements of the two images and/or their corresponding feature maps represent the same objects in three dimensions.

Figure 4A:
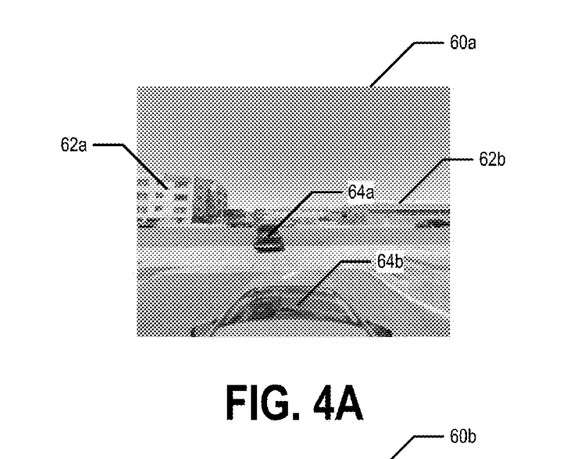
FIGS. 4A and 4B illustrate example images of a similar scene, in accordance with an example embodiment.
Figure 4B:
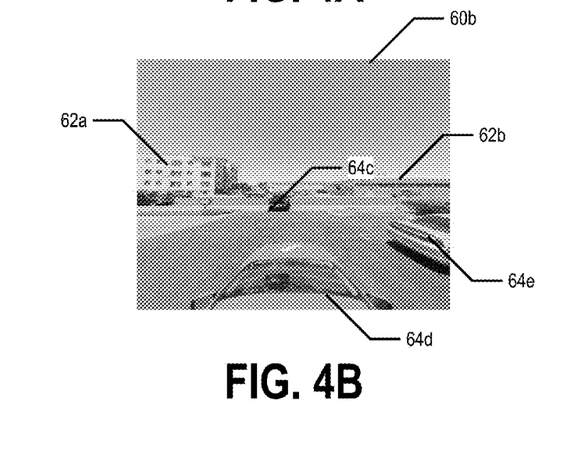

FIGS. 4A and 4B each show one training image of a training image subset. For example, training image 60a and 60b substantially overlap. For example, both training image 60a and 60b comprise static features 62a and 62b. Each of the training images 60a and 60b also comprise non-static features 64 (e.g., 64a, 64b, 64c, 64d, and 64e). For example, training images 60a and 60b were captured at different times, from different locations, and/or from different poses. However, both training images 60a and 60b comprise static features 62a and 62b.

Figure 4C:
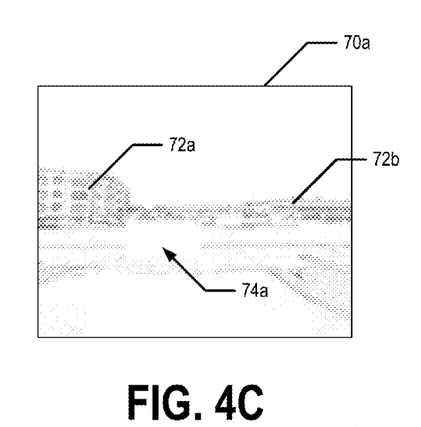
FIGS. 4C and 4D illustrate example feature maps corresponding to the input images of FIGS. 4A and 4B, in accordance with an example embodiment.
Figure 4D:
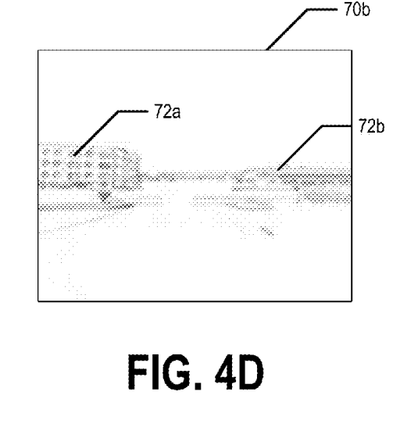

In certain example embodiments, the network 40 may be trained by providing the network 40 with a training image subset comprising two or more training images that substantially overlap and that were captured at different times and/or under different conditions (e.g., weather, lighting, traffic conditions, and/or the like). Different branches of the network may each analyze one of the training images to identify one or more static features therein, extract three dimensional geometry information/data corresponding to each of the one or more static features identified within the training image, and generate a feature map comprising the one or more static features identified within the training image. Thus, the network 40 may generate a feature map for at least two of the two or more training images in the training image subset that substantially overlap. For example, FIG. 4C shows a feature map 70a that was generated from the training image 60a and FIG. 4D shows a feature map 70b that was generated from the training image 60b. The feature maps 70a and 70b each comprise identified static features 72a and 72b. The feature maps 70a and 70b, however, do not comprise any of the non-static features 64 (e.g., 64a, 64b, 64c, 64d, and 64e) present in the training images 60a and 60b. Indeed, as can be seen at empty area 74a, the pixels in image 60a corresponding to non-static feature 64a have been masked. A loss function may be used to determine the similarity between the generated feature maps. For example, assuming that pairs of static features are indexed by some common parameter i, one example loss function is loss=$\Sigma_i d_\theta$ ($f_i$, $f_i'$), where $f_i$ refers to the features from the first training image, $f_i'$ refers to the features from the second training image, and $d_\theta$ is a function that depends on the $L_\theta$ distance between the two sets of static features. In an example embodiment, the $L_\theta$ distance may be computed based on a ground truth relative pose between the first and second training images (e.g., based on the known pose information/data of each of the images) and a relative pose between the first and second training images based on static features within the first and second images. In an example embodiment, the pose error is minimized if the features used to compute the pose error are common across the first and second images. Thus, the loss function may be used to encourage the network 40 to return similar feature maps for similar input images. For example, the loss function may be used to encourage the network 40 to provide consistent feature maps for similar images.

In another example embodiment, the training image subsets may comprise two or more training images that substantially overlap and at least one training image that does not substantially overlap with the other training images in the training image subset. The network 40 may then be charged with determining which of the training images are similar (e.g., substantially overlap) and/or which of the training images are different (e.g., do not substantially overlap with the other training images). The network 40 may then analyze each of the training images in the training image subset to identify one or more static features within the training image, extract three dimensional geometry information/data corresponding to each of the one or more static features identified within the training image, and generate a feature map comprising the one or more static features identified within the training image. The feature maps corresponding to each training image in the training image subset may then be compared to determine which of the training images are similar or most similar and/or which of the training images is different.

Continuing with FIG. 3, at block 108, the network 40 may optionally be tested. For example, if it appears the ability of the network 40 to consistently identify static features within the training images, extract three dimensional geometry information/data of the identified static features, and/or generate a feature map comprising the identified static features has converged, the network 40 may be tested. For example, the network 40 may be tested when the loss function has been minimized and/or when the different training image of each of or 90/95/99% of the training image subsets is identified. For example, the apparatus 10 may test the network 40. For example, the apparatus 10 may comprise means, such as processor 12, memory 14, communications interface 16, user interface 18, and/or the like, for testing the network 40. For example, the network 40 may be provided with two or more test images that are not part of the set of training images. In an example embodiment, the two or more test images may comprise non-static features and/or static features. The two or more test images may comprise at least two images that substantially overlap and that were taken at different times and/or under different conditions. The network 40 may then analyze the test images to identify static features within the test images, extract three dimensional geometry information/data of the identified static features, and/or generate a feature map comprising the identified static features for each test image. It may then be determined if the feature maps corresponding to substantially overlapping test images are sufficiently similar (e.g., the loss function is minimized for the test images in addition to being minimized for the training images) and/or if the feature map corresponding to a non-overlapping test image is sufficiently different from the feature maps corresponding to the substantially overlapping test images that the non-overlapping test image can be confidently identified (e.g., with a confidence interval of 90/95, 98/99% or greater).

If, at block 108, the network 40 fails the test, the process may return to block 106 to continue training the network and/or to block 102 to build a new set of training images and/or to add training images to the set of training images. If, at block 108, the network 40 passes the test and it is determined that the network is sufficiently trained, the process may continue to block 110. At block 110, the trained network 40 may optionally be locked. For example, the connection weights of the trained network 40 may be frozen and/or locked so that they remain at the same values that were used to pass the test at block 108. For example, the apparatus 10 may lock the trained network 40. For example, the apparatus 10 may comprise means, such as processor 12, memory 14, communications interface 16, user interface 18, and/or the like, for locking the trained network 40.

At block 112, the trained network 40 may be used to create, generate, build, update, and/or the like a static feature library or database. For example, branches of the trained network 40 may be provided with images to analyze to identify static features within the training images, extract three dimensional geometry information/data of the identified static features, and/or generate a feature map comprising the identified static features. For example, the apparatus 10 may provide the trained network 40 with images and store the three dimensional geometry information/data of the static features identified in the images and/or the feature maps generated based on the images. For example, the apparatus 10 may comprise means, such as processor 12, memory 14, communications interface 16, user interface 18, and/or the like, for providing the trained network 40 with images and storing the three dimensional geometry information/data of the static features identified in the images and/or the feature maps generated based on the images. In some example embodiments, the trained network 40 may identify static features in images and the apparatus 10 may extract the three dimensional geometry information/data from the images based on the identified static features and/or generate feature maps based on the images. In certain example embodiments, the apparatus 10 may further link static feature information/data to a map tile and/or road segment corresponding to the location of the static feature. In an example embodiment, the apparatus 10 may further store static feature information/data in association with a map tile and/or road segment corresponding to the location of the static feature. Map tiles and/or map tiles and the static feature information/data stored in association therewith may be provided to vehicle apparatuses 20 for use in real time or near real time localization and/or pose determination based on odometry techniques.

Certain example embodiments of the present invention use training image subsets comprising two or more images that substantially overlap but that were captured at different times and/or under different conditions (e.g., weather, lighting, traffic conditions, and/or the like) to train a network to identify time-invariant or static features in images. Thus, after the network has been trained, static features in images do not need to be manually identified and tagged in images. Moreover, the trained network can identify generic static features in images. For example, one trained network can be used to identify all of the building facades, signs, lane lines, lamp posts/street lamps, pavement features, geological features, and/or other static features within images. Moreover, the trained network can be used to identify features in images that are time-invariant (e.g., static) and detectable under various weather, lighting, traffic, and/or other conditions. Therefore, the identified static features may be used for vehicle localization, for example, under various conditions and/or at various times.

Building a Static Feature Library

Figure 5:
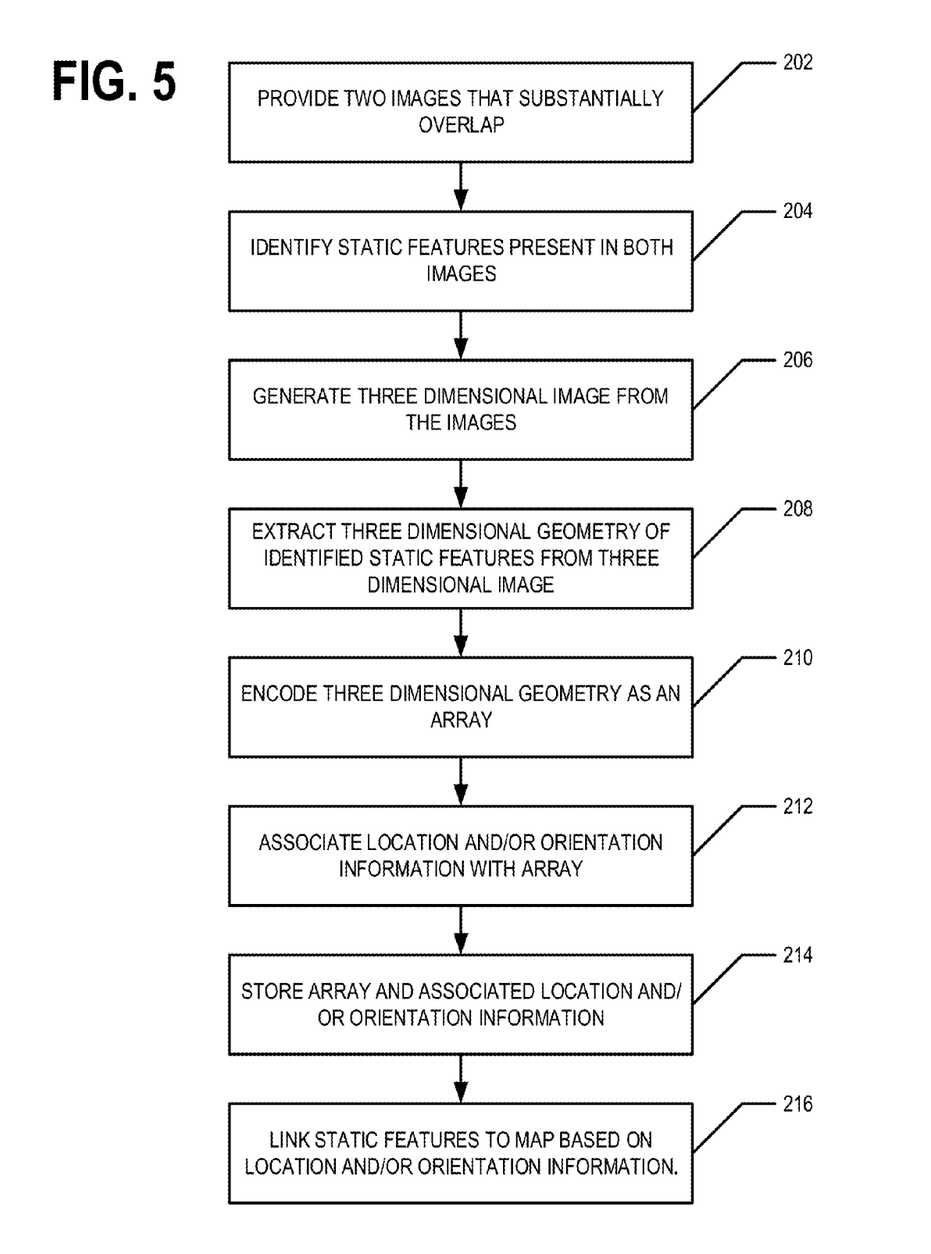
FIG. 5 is a flowchart illustrating operations performed, such as by the apparatus of FIG. 2, in accordance with an example embodiment.

FIG. 5 is a flowchart illustrating processes and procedures that may be completed by the apparatus 10 to build, generate, create, and/or update a static feature library, database, repository, and/or the like using the trained network 40. Starting at block 202, two or more images that substantially overlap are provided to a branch of the trained network 40. For example, the apparatus 10 may receive two or more images that substantially overlap from one or more image capturing apparatuses 5. The apparatus 10 may further receive location and/or pose information/data corresponding to each of the two or more images from the one or more image capturing apparatuses 5. The apparatus 10 may then provide the two or more images that substantially overlap to the trained network 40. In some embodiments, the apparatus 10 may further provide the location and/or pose information/data corresponding to the two or more images to the trained network 40. For example, the apparatus 10 may comprise means, such as the processor 12, memory 14, communications interface 16, user interface 18, and/or the like, for receiving two or more images and the corresponding location and/or pose information/data and providing the two or more images and/or the corresponding location and/or pose information/data to the trained network 40.

At block 204, one or more static features are identified in the two or more images. For example, the network 40 may identify one or more static features in at least two of the two or more images. For example, the network 40 may identify one or more static features in at least two of the two or more images. For example, the network 40 may comprise means, such as one or more processors, and/or the like, for identifying one or more static features in at least two of the two or more images. For example, the network 40 may identify static feature 62a that is present in both image 60a and image 60b.

At block 206, a three dimensional image is generated based on at least two of the two or more images. For example, a three dimensional feature map may be generated based on at least two of the two or more images. In an example embodiment, the feature map may be a binary feature map or a multi-channel feature map. For example, a point correspondence may be determined between at least two of the two or more images, for example, based on the identified one or more static features. Using the determined point correspondence, a three dimensional image comprising one or more identified static features is generated based on at least two of the two or more images. In certain example embodiments, the network 40 or the apparatus 10 may generate a three dimensional image based on at least two of the two or more images. The three dimensional image comprises at least one static feature in common between at least two of the two or more substantially overlapping images. For example, the network 40 and/or apparatus 10 may comprise means, such as processor 12 and/or the like, for generating a three dimensional image based on at least two of the two or more images. As should be understood, various techniques may be used to generate the three dimensional image from at least two of the two or more substantially overlapping images.

At block 208, three dimensional geometry information/data of at least one static feature that is present in three dimensional image is extracted from the three dimensional image. For example, three dimensional geometry information/data for each static feature present in the three dimensional image may be extracted from the three dimensional image. For example, the network 40 and/or the apparatus 10 may extract three dimensional geometry information/data corresponding to at least one static feature present in the three dimensional image. For example, the network 40 and/or the apparatus 10 may comprise means, such as processor 12 and/or the like, for extracting three dimensional geometry information/data for at least one static feature in the three dimensional image. For example, the three dimensional geometry information/data for a static feature may comprise information/data regarding the shape of the static feature and/or other attributes particular to the static feature. For example, as shown in FIG. 4C, the three dimensional geometry information/data may comprise information/data regarding the overall shape of the static feature (e.g., the shape of a building façade corresponding to static features 62a and 62b) and details regarding the texture or surface of the static feature (e.g., the windows in the building façade corresponding to static features 62a and 62b).

At block 210, the extracted three dimensional geometry information/data may be encoded into an array. For example, the three dimensional geometry information/data for each static feature in the three dimensional image may be encoded into an array corresponding to the static feature. For example, each array may encode three dimensional geometry information/data for one static feature. For example, the network 40 and/or the apparatus 10 may encode the extracted three dimensional geometry information/data into an array. For example, the network 40 and/or the apparatus 10 may comprise means, such as processor 12 and/or the like, for encoding the three dimensional geometry information/data into an array. For example, the array may comprise the necessary three dimensional geometry information/data for generating a three dimensional feature map of the corresponding static feature. The array may allow the apparatus 10 to compactly store the three dimensional geometry information/data for the corresponding static feature. In some example embodiments, the three dimensional geometry information/data may be stored using techniques or architectures that do not comprise encoding the three dimensional geometry information/data as an array.

At block 212, location and/or orientation information/data for the corresponding static feature may be associated with the array. For example, ground true location and/or orientation information/data indicating the location of the static feature and/or the orientation of the static feature may be associated with the array, linked with the array, and/or may be encoded as part of the array. For example, the network 40 and/or the apparatus 10 may associate location and/or orientation information/data for the static feature corresponding to the array with the array. For example, the network 40 and/or the apparatus 10 may comprise means, such as processor 12, memory 14, and/or the like, for associating location and/or orientation information/data for the static feature corresponding to the array with the array. The array and the associated corresponding location and/or orientation information/data may comprise static feature information/data corresponding to the static feature for which the array encodes the extracted three dimensional geometry information/data.

At block 214, the static feature information/data may be stored. For example, the network 40 and/or the apparatus 10 may store the static feature information/data. For example, the network 40 and/or apparatus 10 may comprise means, such as the processor 12, memory 14, and/or the like, for storing the static feature information/data. For example, the array and the corresponding location and/or orientation information/data may be stored in association with one another. For example, static feature information/data may be stored in a static feature library, database, repository, and/or the like.

At block 216, the static feature information/data may be stored in association with, linked to, stored as a layer of, and/or the like a map tile or segment within a map tile corresponding to the location of the corresponding static feature. For example, the apparatus 10 may link static feature information/data corresponding to a static feature located within Map Tile A and along Road Segment B with Map Tile A and/or with Road Segment B. For example, the apparatus 10 may comprise means, such as processor 12, memory 14, and/or the like, for linking static feature information/data corresponding to a static feature to a map tile and/or road segment corresponding to the location of the corresponding static feature. For example, Map Tile A may be packaged to include the static feature information/data corresponding to one or more static features that are located within Map Tile A.

A map tile comprising static feature information/data may then be provided through communications network 55 to one or more vehicle apparatus 20. For example, the apparatus 10 may provide (e.g., transmit) one or more map tiles comprising static feature information/data to one or more vehicle apparatuses 20. The vehicle apparatuses 20 may then use at least a portion of the static feature information/data to perform localization and/or pose determination using various odometry techniques. In an example embodiment, a vehicle apparatus 20 may use at least a portion of the static feature information/data to perform localization and/or pose determination to enable autonomous and/or assisted driving of a vehicle that the vehicle apparatus 20 is onboard.

III. Example Apparatus

The apparatus 10 of an example embodiment may be embodied by or associated with a variety of computing devices including, for example, such as a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2 depicts an apparatus 10 of an example embodiment that may be embodied by various computing devices including those identified above. As shown, the apparatus 10 of an example embodiment may include, may be associated with or may otherwise be in communication with a processor 12 and a memory device 14 and optionally a communication interface 16, a user interface 18, and/or other components configured to perform various operations, procedures, functions or the like described herein. As noted above, the apparatus 10 may be in communication with a deep net/neural network 40. In some embodiments, the apparatus 10 may comprise at least one node of the network 40.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14 and/or the like).

The apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example. In certain example embodiments, the geographic database may comprise static feature information/data corresponding to a plurality of static features. In some embodiments, static feature information/data may be linked to a particular road segment. For example, a road segment data record may comprise information/data identifying static feature information/data corresponding to one or more static features located along the road segment. In another example, a road segment data record may comprise static feature information/data corresponding to one or more static features located along the road segment.

The road/link segments and nodes can be associated with attributes, such as geographic coordinates, street names, address ranges, speed limits, turn restrictions at intersections, static feature information/data, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

In an example embodiment, static feature information/data is stored in association with the map information/data. For example, the geographic database may further comprise a database, library, repository, and/or the like of static feature information/data that is stored in association with the map information/data. For example, in some embodiments, static feature information/data corresponding to static features located within a particular map tile is stored as part of (e.g., as a layer, associated map information/data, and/or the like) of the particular map tile.

The geographic database can be maintained by the content provider (e.g., a map developer) in association with the services platform. In an example embodiment, the geographic database may be maintained by the apparatus 10. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more vehicle apparatuses. For example, the apparatus 10 may update the geographic database based on updated map information/data, new and/or updated static feature information/data, and/or the like.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3 and 5 illustrate flowcharts of apparatus 10 and/or network 40, method, and computer program product according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
providing to a trained neural network a first image, wherein the first image (a) is captured by an image capture device at a first location and at a first pose, (b) is associated with geophysical coordinates corresponding to the first location, and (c) comprises one or more static features;
providing to the trained neural network a second image, wherein the second image (a) is captured by an image capture device at a second location and at a second pose, (b) is associated with geophysical coordinates corresponding to the second location, and (c) comprises at least one of the one or more static features;
identifying the at least one of the one or more static features in both the first and second images with a branch of the trained neural network;
generating a three dimensional image comprising the at least one identified static feature and based on the first and second images;
extracting a three dimensional geometry of the at least one identified static feature;
encoding the extracted three dimensional geometry as an array;
based on the first location and second location, determining a static feature location for the at least one identified static feature; and
storing the array in association with a map tile, wherein the map tile is selected based on the static feature location.

2. A method according to claim 1, wherein a set of training images used to train the trained neural network comprises training image subsets comprising two or more images that substantially overlap that were captured at different times.

3. A method according to claim 1, wherein a training set of images used to train the trained neural network comprises training image subsets comprising two or more images that substantially overlap that were captured under different (a) weather conditions, (b) lighting conditions, or (c) weather and lighting conditions.

4. A method according to claim 1, wherein the three dimensional image is a binary feature map.

5. A method according to claim 1, wherein the array comprises shape information for the corresponding static feature.

6. A method according to claim 1, wherein at least one training image of a set of training images used to train the trained network comprises at least one pixel that is masked, the at least one masked pixel corresponding to a non-static feature in the training image.

7. A method according to claim 1, wherein (a) the first location differs from the second location, (b) the first pose differs from the second pose, or (c) both the first location differs from the second location and the first pose differs from the second pose.

8. A method according to claim 1, wherein the static feature of the one or more static features is a generic static feature.

9. A method according to claim 1, wherein static feature information is stored in association with the map tile, the static feature information comprising the array and the static feature location.

10. A method according to claim 9, wherein static feature information is stored in association with a road segment of the map tile.

11. A method according to claim 9, wherein (a) a static feature orientation is determined from at least one of the first location, first pose, second location, or second pose and (b) the static feature information further comprises the static feature orientation.

12. An apparatus comprising at least one processor and at least one memory storing computer program code, the at least one memory and the computer program code configured to, with the processor, cause the apparatus to at least:
provide to a trained neural network a first image, wherein the first image (a) is captured by an image capture device at a first location and at a first pose, (b) is associated with geophysical coordinates corresponding to the first location, and (c) comprises one or more static features;
provide to the trained neural network a second image, wherein the second image (a) is captured by an image capture device at a second location and at a second pose, (b) is associated with geophysical coordinates corresponding to the second location, and (c) comprises at least one of the one or more static features;
identify the at least one of the one or more static features in both the first and second images with a branch of the trained neural network;
generate a three dimensional image comprising the at least one identified static feature and based on the first and second images;
extract a three dimensional geometry of the at least one identified static feature;
encode the extracted three dimensional geometry as an array;
based on the first location and second location, determine a static feature location for the at least one identified static feature; and
store the array in association with a map tile, wherein the map tile is selected based on the static feature location.

13. An apparatus according to claim 12, wherein a set of training images used to train the trained neural network comprises training image subsets comprising two or more images that substantially overlap that were captured at different times.

14. An apparatus according to claim 12, wherein a training set of images used to train the trained neural network comprises training image subsets comprising two or more images that substantially overlap that were captured under different (a) weather conditions, (b) lighting conditions, or (c) weather and lighting conditions.

15. An apparatus according to claim 12, wherein at least one training image of a set of training images used to train the trained network comprises at least one pixel that is masked, the at least one masked pixel corresponding to a non-static feature in the training image.

16. An apparatus according to claim 12, wherein (a) the first location differs from the second location, (b) the first pose differs from the second pose, or (c) both the first location differs from the second location and the first pose differs from the second pose.

17. An apparatus according to claim 12, wherein static feature information is stored in association with the map tile, the static feature information comprising the array and the static feature location.

18. An apparatus according to claim 17, wherein static feature information is stored in association with a road segment of the map tile.

19. An apparatus according to claim 17, wherein (a) a static feature orientation is determined from at least one of the first location, first pose, second location, or second pose and (b) the static feature information further comprises the static feature orientation.

20. A computer program product comprising at least one non-transitory computer-readable storage medium having computer-executable program code instructions stored therein, the computer-executable program code instructions comprising program code instructions configured to:

provide to a trained neural network a first image, wherein the first image (a) is captured by an image capture device at a first location and at a first pose, (b) is associated with geophysical coordinates corresponding to the first location, and (c) comprises one or more static features;

provide to the trained neural network a second image, wherein the second image (a) is captured by an image capture device at a second location and at a second pose, (b) is associated with geophysical coordinates corresponding to the second location, and (c) comprises at least one of the one or more static features;

identify the at least one of the one or more static features in both the first and second images with a branch of the trained neural network;

generate a three dimensional image comprising the at least one identified static feature and based on the first and second images;

extract a three dimensional geometry of the at least one identified static feature;

encode the extracted three dimensional geometry as an array;

based on the first location and second location, determine a static feature location for the at least one identified static feature; and store the array in association with a map tile, wherein the map tile is selected based on the static feature location.

\* \* \* \* \*